US012793131B2

(12) United States Patent
Oh

(10) Patent No.: US 12,793,131 B2
(45) Date of Patent: Nov. 10, 2026

(54) ASSET TRADING METHOD GENERATING TRANSACTION FOR PLURALIRTY OF ASSET CHANGE VALUES USING PERMUTATION AND SYSTEM PERFORMING SAME

(71) Applicant: Zkrypto Inc., Seoul (KR)

(72) Inventor: Hyun ok Oh, Seoul (KR)

(73) Assignee: Zkrypto Inc., Seoul (KR)

( * ) Notice: Subject to any disclaimer, the term of this patent is extended or adjusted under 35 U.S.C. 154(b) by 73 days.

(21) Appl. No.: 19/004,451

(22) Filed: Dec. 30, 2024

(65) Prior Publication Data

US 2026/0148298 A1 May 28, 2026

(30) Foreign Application Priority Data

Nov. 25, 2024 (KR) ........................ 10-2024-0169226

(51) Int. Cl.
*G06Q 40/04* (2012.01)
*G06Q 20/40* (2012.01)

(52) U.S. Cl.
CPC ........... *G06Q 40/04* (2013.01); *G06Q 20/401* (2013.01)

(58) Field of Classification Search
None
See application file for complete search history.

(56) References Cited

U.S. PATENT DOCUMENTS 11,226,952 B2 * 1/2022 Li ........................ G06Q 20/389
2010/0217725 A1 * 8/2010 Clyne .................... G06Q 40/04 705/37
2019/0327078 A1 * 10/2019 Zhang ................... H04L 9/3218
2020/0175509 A1 * 6/2020 Qi ........................ G06Q 20/389
2020/0364704 A1 * 11/2020 Qi ........................ G06Q 20/389
2023/0121239 A1 * 4/2023 Karni ..................... G06Q 40/04 705/37

FOREIGN PATENT DOCUMENTS

CN 118590240 A 9/2024

OTHER PUBLICATIONS

European Patent Office, European Search Report issued for European Patent Application No. 24223524.0, Jun. 24, 2025.
Byeongjun Jang et al., Lego-DLC: batching module for commit-carrying SNARK under Pedersen Engines, IACR, International Association for Cryptologic Research, Sep. 9, 2024.
Fuchsbauer Georg et al., Non-interactive Mimblewimble Transactions, Revisited, IACR, International Association for Cryptologic Research, Jan. 25, 2023.

* cited by examiner

*Primary Examiner* — Sanchit K Sarker
(74) *Attorney, Agent, or Firm* — Nicholas Park

(57) ABSTRACT

The technical idea of the present invention relates to an asset trading method for generating a transaction for a plurality of asset change values using permutation, and a system for performing the same. According to an embodiment of the disclosure, an asset trading method performed by at least one processor may include obtaining the plurality of asset change values serving as trading targets, sequentially generating a plurality of commitment values for each of the plurality of asset change values, permuting an order of the plurality of asset change values, generating a transaction by sequentially arranging the plurality of commitment values and the plurality of permuted asset change values, and trading assets by verifying the transaction in a smart contract.

6 Claims, 9 Drawing Sheets

FIG. 3

$\mathcal{R}(\boldsymbol{x}; \boldsymbol{u}, \boldsymbol{w})$ $\boldsymbol{x} = \{\tau\}$ $\boldsymbol{u} = \left\{\text{agg}_m, \text{agg}_r, F, \{\Delta m_i'\}_{i\in[N]}, \{m_i + \Delta m_i, o_i + \Delta o_i\}_{i\in[N]}, \{\Delta m_i, \Delta o_i\}_{i\in[N]}\right\}$ $\boldsymbol{w} = \perp$ assert $0 \leq \forall m_i + \Delta m_i = m_i' \leq \text{Limit}$ assert $F \cdot \prod_{i=1}^{N}(\tau + \Delta m_i') = F \cdot \prod_{i=1}^{N}(\tau + \Delta m_i)$ // Permutation check assert $\sum_{i=1}^{N} \Delta m_i = 0$ assert $\text{agg}_m = \sum_{i=1}^{N} \tau^i \cdot \Delta m_i' + \sum_{i=1}^{N} \tau^{N+i} \cdot (m_i + \Delta m_i) + \sum_{i=1}^{N} \tau^{2N+i} \cdot \Delta m_i$ assert $\text{agg}_o = \sum_{i=1}^{N} \tau^{N+i} \cdot (o_i + \Delta o_i) + \sum_{i=1}^{N} \tau^{2N+i} \cdot \Delta o_i$

ASSET TRADING METHOD GENERATING TRANSACTION FOR PLURALIRTY OF ASSET CHANGE VALUES USING PERMUTATION AND SYSTEM PERFORMING SAME

CROSS-REFERENCE TO RELATED APPLICATION

This application claims priority to and the benefit of Korean Patent Application No. 10-2024-0169226, filed Nov. 25, 2024, the disclosure of which is incorporated herein by reference in its entirety.

BACKGROUND

Technical Field

The present invention relates to an asset trading method for generating transactions for a plurality of asset change values using permutation, and a system performing the same.

Background Art

Smart contracts are being used in asset trading. Smart contract is an automated digital contract based on blockchain technology, and may be viewed in the form of digitizing legal contracts. When a user requests trading to execute asset trading, the entity that manages the user's account creates a transaction to reflect it in a smart contract. The transaction includes a proof value for proving the asset change values, and a zero-knowledge proof algorithm is used to generate such a proof value.

The zero-knowledge proof algorithm is an algorithm that verifies the integrity of a message without identifying the message (for example, an asset or an asset change value), and a problem that it takes a long time to generate a transaction occurs due to the time required for such a zero-knowledge proof algorithm.

SUMMARY

Technical Problem

An object of the present invention is to provide a method of generating a transaction for a plurality of asset change values using permutation.

Another object of the present invention is to provide an efficient method when generating a proof value for a plurality of asset change values.

Technical Solution

According to an embodiment of the disclosure, an asset trading method performed by at least one processor may include: obtaining a plurality of asset change values serving as trading targets; sequentially generating a plurality of commitment values for each of the plurality of asset change values; permuting the plurality of asset change values, generating a transaction by sequentially arranging the plurality of commitment values and the plurality of permuted asset change values; and trading assets by verifying the transaction in a smart contract.

In an embodiment, the plurality of commitment values may have a Pedersen commitment form.

In an embodiment, the generating the transaction may include: obtaining a plurality of addresses respectively corresponding to the plurality of asset change values; permuting the plurality of addresses to correspond to the plurality of permuted asset change values; and generating the transaction by sequentially arranging the plurality of commitment values, the plurality of permuted asset change values, and the plurality of permuted addresses.

In an embodiment, the method may further include: performing proof for the plurality of commitment values using zero-knowledge proof; performing proof for the plurality of asset change values using zero-knowledge proof; and including, in the transaction, a proof value generated as a result of the proof for the plurality of commitment values and the plurality of asset change values.

In an embodiment, the proving the plurality of commitment values may include: obtaining a verification random value; generating an asset aggregation value based on the verification random value, the plurality of asset change values, and the plurality of permuted asset change values; and proving the asset aggregation value using zero-knowledge proof.

In an embodiment, when the verification random value is r, a current asset value is $m_i$, the plurality of asset change values is $\Delta m_i$, the plurality of permuted asset change values is $$\Delta m_i',$$

and the number of the plurality of asset change values is N, the asset aggregation value $agg_m$ may be generated based on the following equation.

$$agg_m = \sum_{i=1}^{N} r^i \cdot \Delta m_i' + \sum_{i=1}^{N} r^{N+i} \cdot (m_i + \Delta m_i') + \sum_{i=1}^{N} r^{2N+i} \cdot (\Delta m_i)$$

In an embodiment, the proving the plurality of commitment values may include: obtaining a plurality of asset random values respectively corresponding to the asset change values; generating a random aggregation value based on the verification random value and the plurality of asset random values; and proving the random aggregation value using zero-knowledge proof.

In an embodiment, the proving the plurality of asset change values may include: obtaining a verification random value; and proving whether the plurality of permuted asset change values corresponds to the plurality of asset change values, based on the verification random value, the plurality of asset change values, and the plurality of permuted asset change values, using zero-knowledge proof.

In an embodiment, when the verification random value is r, the plurality of asset change values is $\Delta m_i$, the plurality of permuted asset change values is $$\Delta m_i',$$

and the number of the plurality of asset change values is N, whether the plurality of permuted asset change values corresponds to the plurality of asset change values may be proved based on the following equation.

$$\prod_{i=1}^{N}(r+\Delta m_i')=\prod_{i=1}^{N}(r+\Delta m_i)$$

BRIEF DESCRIPTION OF THE DRAWINGS

FIG. 3 is a diagram illustrating a code for an asset trading method according to an example embodiment.

DETAILED DESCRIPTION

Figure 1:
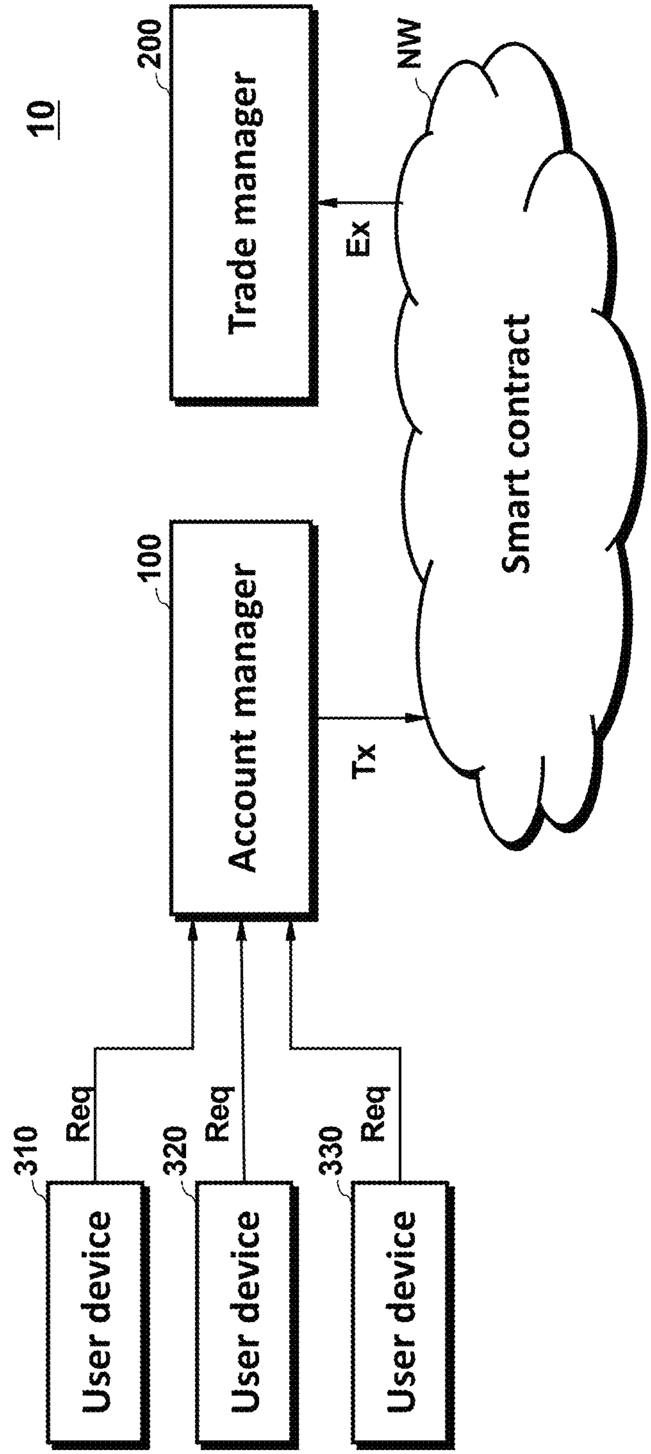
FIG. 1 is a block diagram illustrating an asset trading system according to an example embodiment.

Hereinafter, exemplary embodiments of the present disclosure will be described in detail with reference to the accompanying drawings. Advantages and features of the present disclosure, and methods of achieving the advantages and features will become apparent with reference to embodiments described below in detail in conjunction with the accompanying drawings. However, the technical spirit of the present invention is not limited to the following embodiments, but may be implemented in various different forms, and the following embodiments are provided only to complete the technical spirit of the present invention and to fully inform those skilled in the art to which the present invention pertains of the scope of the present invention, and the technical spirit of the present invention is only defined by the scope of claims.

It should be noted that, in adding reference numerals to elements of each drawing, the same elements are denoted by the same reference numerals as possible even though they are illustrated in different drawings. In addition, in describing the present disclosure, when it is determined that a detailed description of a related known configuration or function may obscure the gist of the present disclosure, the detailed description thereof will be omitted.

Unless otherwise defined, all terms (including technical and scientific terms) used herein have the same meaning as commonly understood by one of ordinary skill in the art to which the inventive concept belongs. In addition, terms defined in generally used dictionaries are not ideally or excessively interpreted unless they are clearly specifically defined. The terms used herein are for the purpose of describing the embodiments and are not intended to limit the present invention. In the present specification, a singular form includes a plural form unless otherwise specified.

In addition, in describing the components of the present disclosure, terms such as first, second, A, B, (a), (b), and the like may be used. The terms are only used to distinguish the elements from other elements, and the nature, order, or order of the corresponding elements is not limited by the terms.

When it is described that a certain element is "connected", "coupled", or "connected" to another element, the element may be directly connected or connected to the other element, but it should be understood that another element may be "connected", "coupled", or "connected" between each element.

It will be further understood that the terms "comprises" and/or "comprising," when used in this specification, specify the presence of stated components, steps, operations, and/or elements, but do not preclude the presence or addition of one or more other components, steps, operations, and/or elements.

Components included in any one embodiment and components including common functions may be described using the same name in another embodiment. Unless otherwise stated, the description given in any one embodiment may also be applied to other embodiments, and specific descriptions may be omitted within a redundant range or a range that can be understood by those skilled in the art.

Hereinafter, some embodiments of the inventive concept will be described in detail with reference to the accompanying drawings.

Hereinafter, the present invention will be described in detail with reference to preferred embodiments of the present invention and the accompanying drawings.

FIG. 1 is a block diagram illustrating an asset trading system according to an example embodiment.

Referring to FIG. 1, an asset trading system 10 may execute asset trading, and for this purpose, may include an account manager 100, a trade manager 200, a plurality of user devices 310 to 330, and a smart contract NW.

The account manager 100 may be managed by a management institution that deposits assets and manages trading, and in an example, the management institution may include a bank. In the present specification, an asset may mean a financial asset or a physical asset deposited or entrusted to a management institution, and in an example, may mean a deposit, a tokenized security, or the like.

The trade manager 200 may be operated by a brokerage agency that brokers trading of assets, and in an example, the brokerage agency may include an over the counter broker and an exchange.

The plurality of user devices 310 to 330 may deposit an asset in the account manager 100 and may be managed by a user who executes asset trading.

The account manager 100, the trade manager 200, and the plurality of user devices 310 to 330 may include various communication-enabled terminal devices such as a cellular phone, a smart phone, a laptop, a personal computer (PC), a navigation device, a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband Internet (Wibro) terminal, a smart pad, a tablet PC, and the like. In another example, the account manager 100, the trade manager 200, and the plurality of user devices 310 to 330 may be implemented as a server.

The account manager 100, the trade manager 200, and the plurality of user devices 310 to 330 may be connected to each other through a network capable of communicating with each other by wire or wirelessly, and when they are connected to each other by wire, the network may use a serial method, and when they are connected wirelessly, the network may communicate with each other using a wireless communication network. The wireless communication network includes a Local Area Network (LAN), a Wide Area Network World Wide Web (WAN), the Internet (WWW), a wired/wireless data communication network, a telephone network, a wired/wireless television communication network, 3G, 4G, 5G, 3rd Generation Partnership Project (3GPP), 5th Generation Partnership Project (5GPP), Long Term Evolution (LTE), World Interoperability for Microwave Access (WIMAX), Wi-Fi, the Internet, a Local Area Network (LAN), a Wireless Local Area Network (Wireless LAN), a Wide Area Network (WAN), a Personal Area Network (PAN), a Radio Frequency (RF), a Bluetooth network, a Near-Field Communication (NFC) network, a satellite broadcasting network, an analog broadcasting network, a Digital Broadcasting (DMB) network, a blockchain network, and the like, but is not limited thereto.

The plurality of user devices 310 to 330 may be entrusted to a management institution that operates the account manager 100, and may transmit a request Req for trading assets to the account manager 100.

The account manager 100 may generate one transaction Tx in response to the request Req received from the plurality of user devices 310 to 330 and transmit the transaction Tx to the smart contract NW. In this case, the request Req may include information on an asset change value serving as a trading target, and the account manager 100 may calculate a commitment value corresponding to the asset change value based on the request Req. In the present specification, a commitment value may refer to a value converted into a form of a Pedersen commitment based on a message m corresponding to an asset or an asset change value, a commit key, and a random value.

In an embodiment, the account manager 100 may prove asset change values based on a zero-knowledge proof algorithm during the asset trading. In the present specification, zero-knowledge proof method is a method of verifying the integrity of a message without identifying the message (e.g., asset/asset change value), and in an example, zero-knowledge SNARK (zk-SNARK), commit carrying SNARK (cc-SNARK), and Groth 16 may be used as zero-knowledge proof method.

The account manager 100 may generate one transaction Tx using a plurality of asset change values respectively corresponding to a plurality of requests Req. In an embodiment, when generating the transaction Tx, the account manager 100 may permute the plurality of asset change values and may generate the transaction Tx using the plurality of permuted asset change values.

According to the technical idea of the present disclosure, since the account manager 100 includes the plurality of permuted asset change values in the transaction Tx, even if the transaction Tx is exposed to the outside, an account or a user corresponding to the asset change values may not be specified, and as a result, security for the transaction Tx may be increased.

In addition, according to the technical idea of the present disclosure, one proof value corresponding to a plurality of asset change values may be generated instead of one proof value corresponding to one asset change value, and as a result, the time required to generate the proof value may be greatly reduced, and a high-speed trading may be possible.

The smart contract NW may receive the transaction Tx, verify the transaction Tx using the proof value included in the transaction Tx, verify the integrity of the plurality of commitment values included in the transaction Tx, and when the integrity is verified, transmit transaction information Ex to the trade manager 200 when the verification is completed.

In another embodiment, the trade manager 200 itself may be configured as the smart contract NW.

In the present specification, the operations of the account manager 100, the trade manager 200, and the plurality of user devices 310 to 330 may refer to operations performed by a processor included in each component, based on a computer program including at least one instruction stored in a storage device included in each component, and the storage device may include a non-volatile memory, a volatile memory, a flash memory, a hard disk drive (HDD), a solid state drive (SSD), or the like. The processor may include at least one of a central processing unit (CPU), a graphic processing unit (GPU), a neural processing unit (NPU), a random access memory (RAM), a read only memory (ROM), a system bus, and an application processor. In addition, the operation of the smart contract NW may indicate the operation of software and hardware components constituting the blockchain constituting the smart contract.

Figure 2:
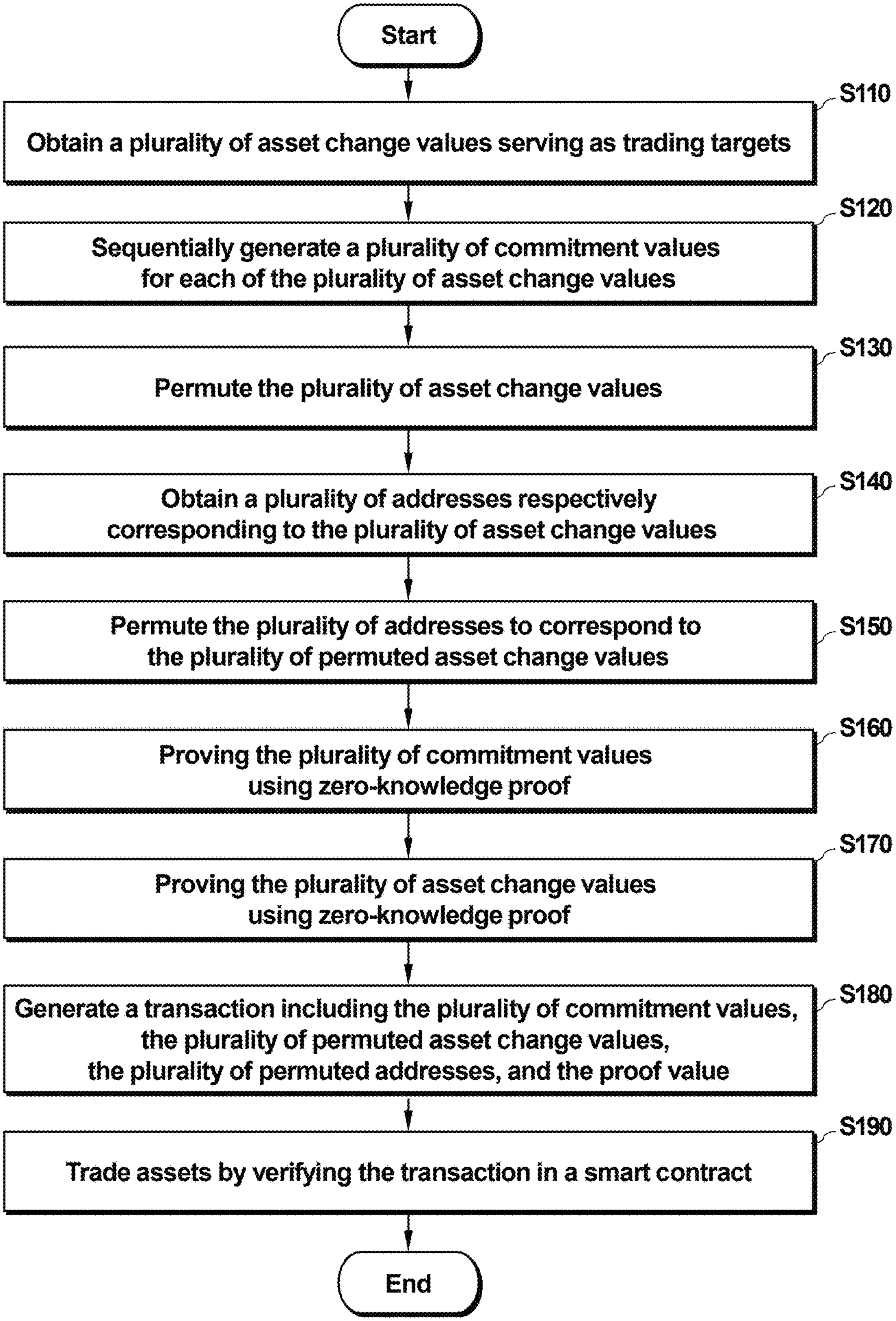
FIG. 2 is a flowchart illustrating an asset trading method according to an example embodiment.

FIG. 2 is a flowchart illustrating an asset trading method according to an example embodiment, and FIG. 3 is a diagram illustrating a code for an asset trading method according to an example embodiment.

Referring to FIGS. 2 and 3, the account manager 100 may obtain a plurality of asset change values serving as trading targets from the plurality of user devices 310 to 330, step S110. The account manager 100 may sequentially generate a plurality of commitment values for each of the plurality of asset change values, step S120. In the present specification, "sequential" may mean processing and placing data according to a predetermined order.

The account manager 100 may permute the plurality of asset change values, step S130. In an embodiment, the account manager 100 may change and arrange the plurality of asset change values in a random order rather than an order stored in the database.

The account manager 100 may obtain a plurality of addresses respectively corresponding to the plurality of asset change values, step S140, and may permute the plurality of addresses to correspond to the plurality of permuted asset change values, step S150.

The account manager 100 may prove a plurality of commitment values, step S160, and a plurality of asset change values, step S170, using zero-knowledge proof. The account manager 100 may generate a transaction Tx including the plurality of commitment values, the plurality of permuted asset change values, the plurality of permuted addresses, and the proof value, step S180.

The account manager 100 may transmit the transaction Tx to the smart contract NW. The smart contract NW may allow the trade manager 200 to enable assets to be traded by verifying the transaction Tx, step S190.

Figure 4:
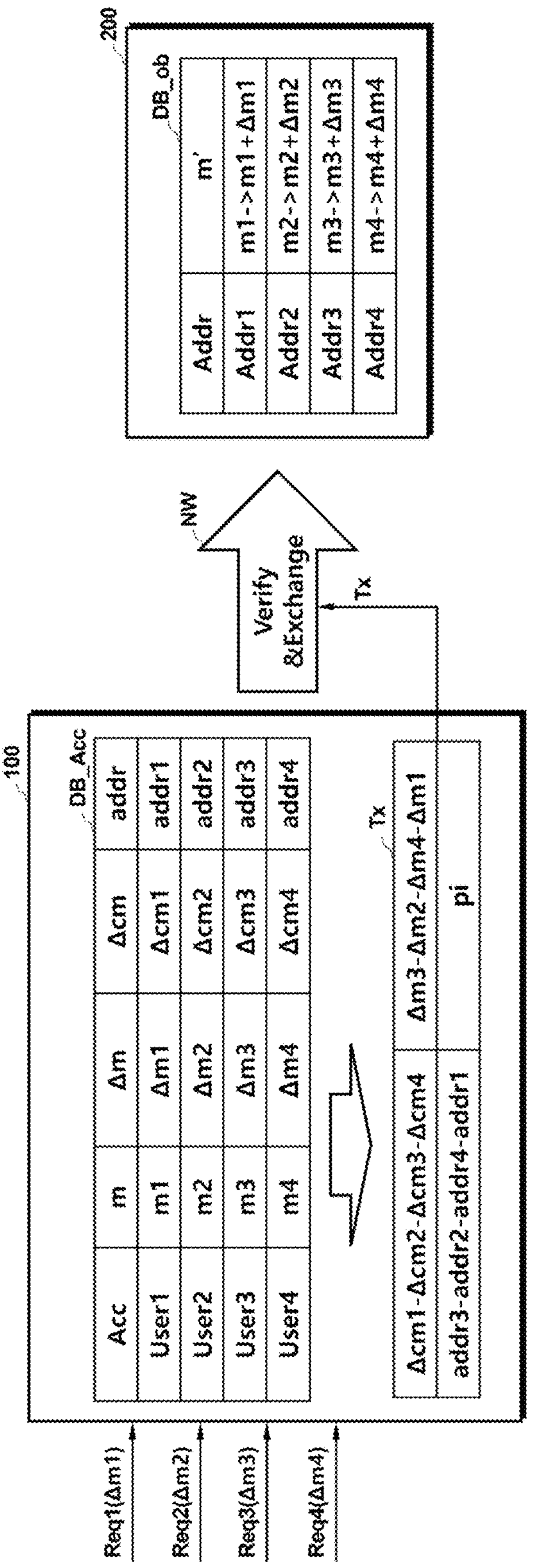
FIG. 4 is a diagram illustrating an asset trading method according to an example embodiment.

FIG. 4 is a diagram illustrating an asset trading method according to an example embodiment.

Referring to FIG. 4, the plurality of requests Req1 to Req4 received from the plurality of user devices 310 to 330 may include asset change values $\Delta m1$ to $\Delta m4$ corresponding to the amount of assets that users want to trade.

The account manager 100 may store the asset change values $\Delta m1$ to $\Delta m4$ in an account database DB_Acc, and may generate commitment values $\Delta cm1$ to $\Delta cm4$ corresponding to the asset change values $\Delta m1$ to $\Delta m4$. In an embodiment, the commitment values $\Delta cm1$ to $\Delta cm4$ may be configured in the form of a Pedersen commitment configured in the form of an exponent of a message (e.g., an asset change value) for a commit key and a random value corresponding to the message. The account manager 100 may sequentially include the commitment values $\Delta cm1$ to $\Delta cm4$ in the transaction Tx. For example, the account manager 100 may include commitment values Δcm1 to Δcm4 in the transaction Tx in the order of Δcm1-Δcm2-Δcm3-Δcm4.

The account manager 100 may permute the asset change values Δm1 to Δm4. For example, the account manager 100 may randomly permute the asset change values Δm1 to Δm4, such as Δm3-Δm2-Δm4-Δm1. The account manager 100 may include permuted asset change values in the transaction Tx.

The account manager 100 may obtain addresses corresponding to the order of the permuted asset change values. In an embodiment, the account manager 100 may configure the addresses as addr3-addr2-addr4-addr1 to correspond to Δm3-Δm2-Δm4-Δm1. The account manager 100 may include the permuted addresses in the transaction Tx.

According to an embodiment of the present disclosure, when the account manager 100 includes the asset change values in the transaction after permuting, even if a third party identifies the transaction Tx, the asset change values may not be matched to the corresponding account, and as a result, the trading content including the asset change values may not be exposed to the outside, and the security of the trading may be increased.

The account manager 100 may generate a proof value pi based on zero-knowledge proof method using a plurality of commitment values Δcm1-Δcm2-Δcm3-Δcm4 and a plurality of permuted asset change values Δm3-Δm2-Δm4-Δm1, and transmit the transaction Tx including the proof value pi to the smart contract NW.

The smart contract NW may verify whether the plurality of commitment values Δcm1-Δcm2-Δcm3-Δcm4 is properly generated based on the transaction Tx. In addition, the smart contract NW may verify whether the plurality of permuted asset change values Δm3-Δm2-Δm4-Δm1 corresponds to the plurality of asset change values corresponding to the plurality of commitment values Δcm1-Δcm2-Δcm3-Δcm4, that is, whether pairs of the plurality of permuted asset change values Δm3-Δm2-Δm4-Δm1 and the plurality of asset change values Δm1-Δm2-Δm3-Δm4 match.

When the verification succeeds, the trade manager 200 may record the asset change values Δm1 to Δm4 serving as trading targets to correspond to the address in an order book on the smart contract NW, and the trading may be executed based on the order book on the smart contract NW.

According to an embodiment of the present disclosure, as the trade manager 200 execute trading based on one transaction Tx with respect to a plurality of trades, an accurate and fast trading may be executed even when zero-knowledge proof method is used.

In the present specification, a method of requesting trading from the account manager 100 to the trade manager 200 is described, but the technical idea of the present disclosure may also be applied to a case in which trading contents are reflected from the trade manager 200 to the account manager 100 at the time of trading success. In an example, the trade manager 200 may generate commitment values for a completed trade, generate a transaction using the commitment values and permuted asset change values, and verify the transaction generated by the smart contract NW, so that the trading made in the account database DB_Acc may be reflected.

In addition, in FIG. 4, the account database DB_Acc included in the account manager 100 and the order book database DB_ob included in the trade manager 200 are described in the form of a database for convenience of description, but in an embodiment of the present disclosure, they may be implemented on the smart contract NW.

Figure 5:
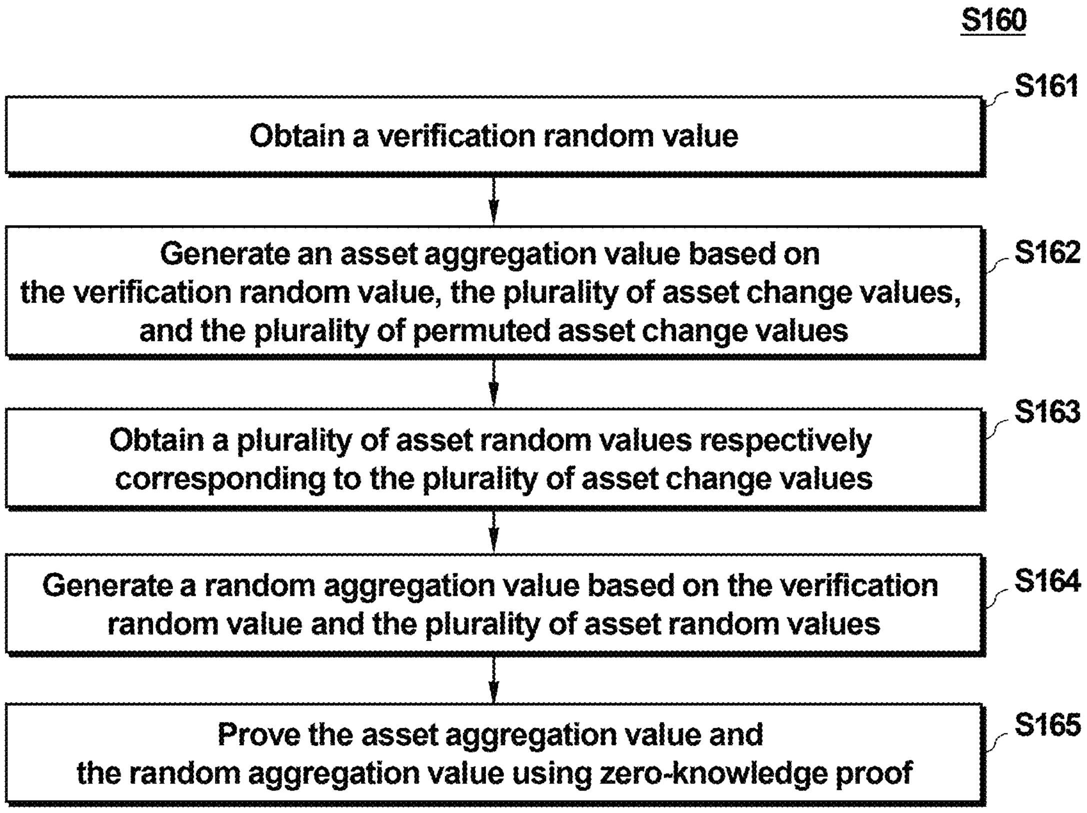
FIG. 5 is a flowchart illustrating an asset trading method according to an example embodiment.

FIG. 5 is a flowchart illustrating an asset trading method according to an example embodiment. In detail, FIG. 5 illustrates a proof step S160 for the plurality of commitment values in FIG. 2.

Referring to FIG. 5, the account manager 100 may obtain a verification random value, step S161. In an embodiment, the verification random value may be received from the trade manager 200, and in another embodiment, the verification random value may be determined as a value obtained by hashing the commitment values.

The account manager 100 may generate an asset aggregation value based on the verification random value, the plurality of asset change values, and the plurality of permuted asset change values, step S162. In the present specification, an aggregation value may mean a value obtained by combining an asset change value or an asset random value into one value.

The account manager 100 may obtain a plurality of asset random values respectively corresponding to the plurality of asset change values. step S163. In an example, the account manager 100 may obtain a plurality of asset random values through a hash for each of the asset change values.

The account manager 100 may generate a random aggregation value based on the verification random value and the plurality of asset random values, step S164.

The account manager 100 may prove the asset aggregation value and the random aggregation value using zero-knowledge proof, step S165. In addition, the smart contract NW may verify whether the proof is correct using the asset aggregation value and the random aggregation value obtained from the commitment value.

According to an embodiment of the disclosure, by verifying a current asset value, an asset change value, a permuted asset change value, and an asset random value using an aggregation value, various elements may be proved and verified through one value, and as a result, the time required to utilize zero-knowledge proof may be reduced and high-speed proof is possible.

Figure 6:
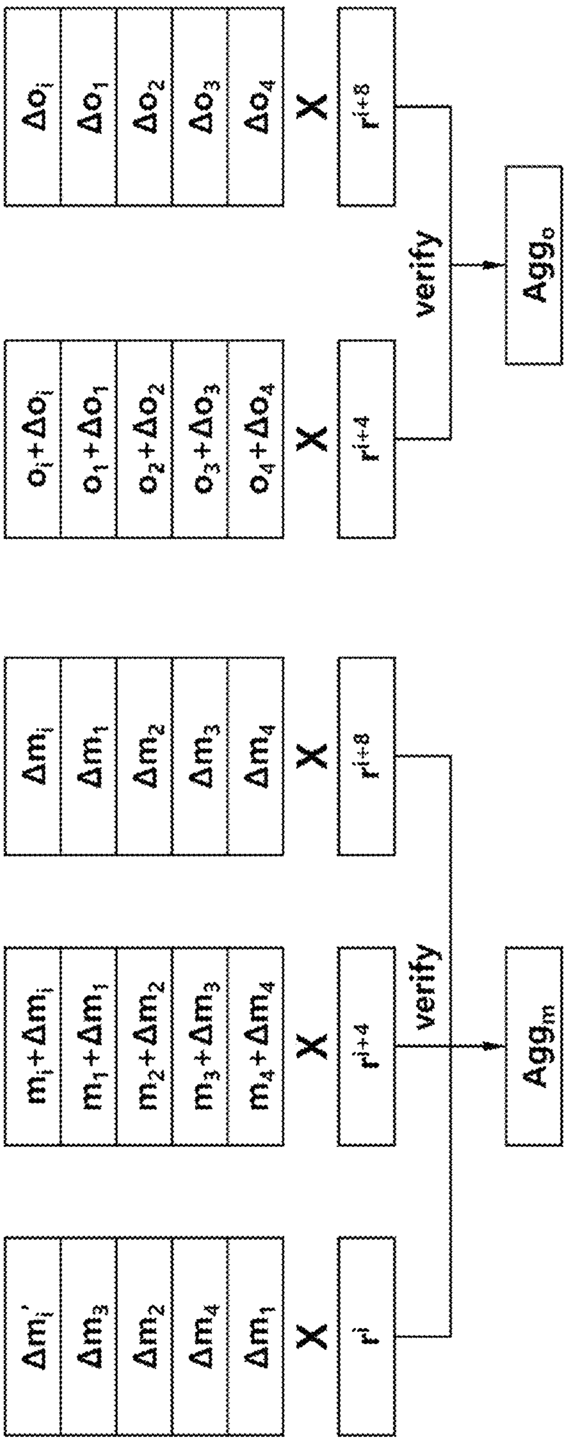
FIG. 6 is a diagram illustrating an asset trading method, according to an example embodiment.

FIG. 6 is a diagram illustrating an asset trading method according to an example embodiment. In detail, FIG. 6 illustrates a proof method for a plurality of commitment values.

Referring to FIG. 6, the account manager 100 may obtain an asset aggregation value using a plurality of permuted asset change values $$\Delta m'_i,$$

a plurality of asset change values $\Delta m_i$, a current asset value $m_i$, and a verification random value.

In an example, when the verification random value is r, the current asset value is $m_i$, the plurality of asset change values is $\Delta m_i$, the plurality of permuted asset change values is $$\Delta m'_i,$$

and the number of the plurality of asset change values is N, the account manager 100 may generate the asset aggregation value $agg_m$ based on [Equation 1] below.

$$agg_m = \sum_{i=1}^{N} r^i \cdot \Delta m'_i + \sum_{i=1}^{N} r^{N+i} \cdot (m_i + \Delta m'_i) + \sum_{i=1}^{N} r^{2N+i} \cdot (\Delta m_i) \quad \text{[Equation 1]}$$

The account manager 100 may obtain a random aggregation value using a plurality of asset random values $\Delta o_i$ corresponding to the plurality of asset change values $\Delta m_i$, a plurality of asset random values $o_i$ corresponding to the current asset value $m_i$, and the verification random value.

In an example, when the verification random value is r, the plurality of asset random values corresponding to the current asset value is $o_i$, the plurality of asset random values corresponding to the plurality of asset change values is $\Delta o_i$, and the number of the plurality of asset change values is N, the account manager 100 may generate the random aggregation value $agg_o$ based on [Equation 2] below.

$$agg_o = \sum_{i=1}^{N} r^{N+i} \cdot (o_i + \Delta o_i) + \sum_{i=1}^{N} r^{2N+i} \cdot \Delta o_i \quad \text{[Equation 2]}$$

According to an exemplary embodiment of the present disclosure, when generating an aggregation value, each element may be distinguished by exponentiation of a verification random value $r^i$. Accordingly, various elements such as an asset change value and a current asset value may be proved and verified with one aggregation value.

Figure 7:
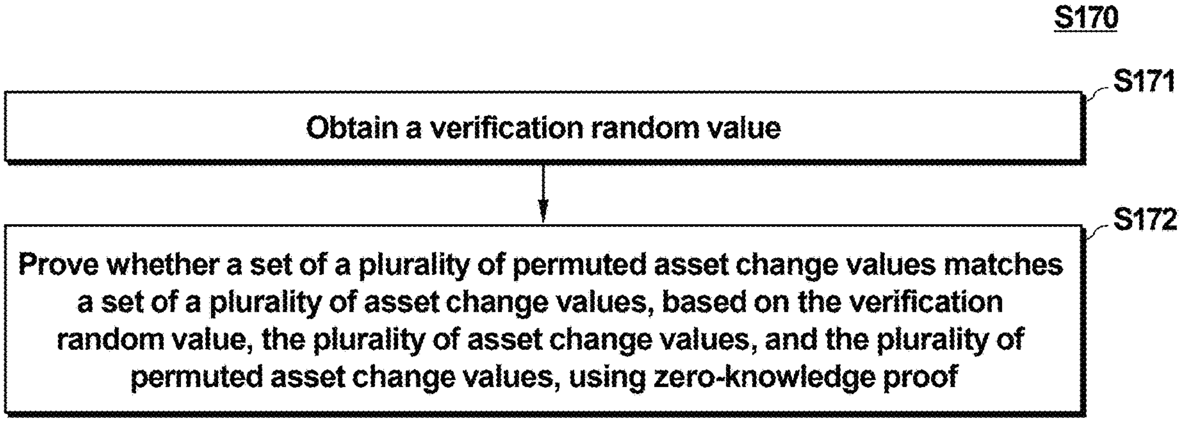
FIG. 7 is a flowchart illustrating an asset trading method according to an example embodiment.

FIG. 7 is a flowchart illustrating an asset trading method according to an example embodiment. In detail, FIG. 7 illustrates a proof step S170 for a plurality of asset change values of FIG. 2.

Referring to FIG. 7, the account manager 100 may obtain a verification random value, step S171. In an embodiment, the verification random value may be the same as the verification random value described with reference to FIG. 5.

The account manager 100 may prove whether a set of a plurality of permuted asset change values matches a set of a plurality of asset change values, based on the verification random value, the plurality of asset change values, and the plurality of permuted asset change values, using zero-knowledge proof, step S172.

According to an embodiment of the present disclosure, despite a plurality of asset change values are permuted for enhancement of security, the account manager 100 may use zero-knowledge proof to prove whether asset change values are included in a transaction Tx by identifying whether a set of a plurality of permuted asset change values matches a set of a plurality of asset change values, thereby integrity of the transaction Tx may be proved.

Figure 8:
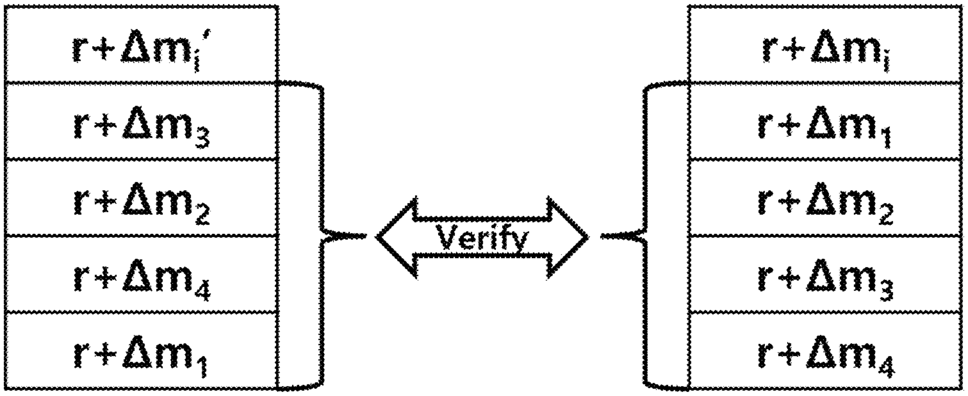
FIG. 8 is a diagram illustrating an asset trading method according to an example embodiment.

FIG. 8 is a diagram illustrating an asset trading method according to an example embodiment. In detail, FIG. 8 shows a proof method for a plurality of asset change values.

Referring to FIG. 8, the account manager 100 may prove whether a first value, obtained by multiplying all values of a plurality of permuted asset change values $$\Delta m_i'$$

combined with a verification random value r, is equal to a second value, obtained by multiplying all values of a plurality of asset change values $\Delta m_i$ combined with the verification random value r.

In an example, when the verification random value is r, the plurality of asset change values is $\Delta m_i$, the plurality of permuted asset change values is $$\Delta m_i',$$

and the number of the plurality of asset change values is N, the account manager 100 may prove whether the plurality of permuted asset change values correspond to the plurality of asset change values based on [Equation 3] below.

$$\prod_{i=1}^{N} (r + \Delta m_i') = \prod_{i=1}^{N} (r + \Delta m_i) \quad \text{[Equation 3]}$$

According to an embodiment of the present disclosure, even if asset change values are permuted for confidentiality, the integrity of the asset change values may be proved in a simplified manner by proving whether the entire set is the same.

Figure 9:
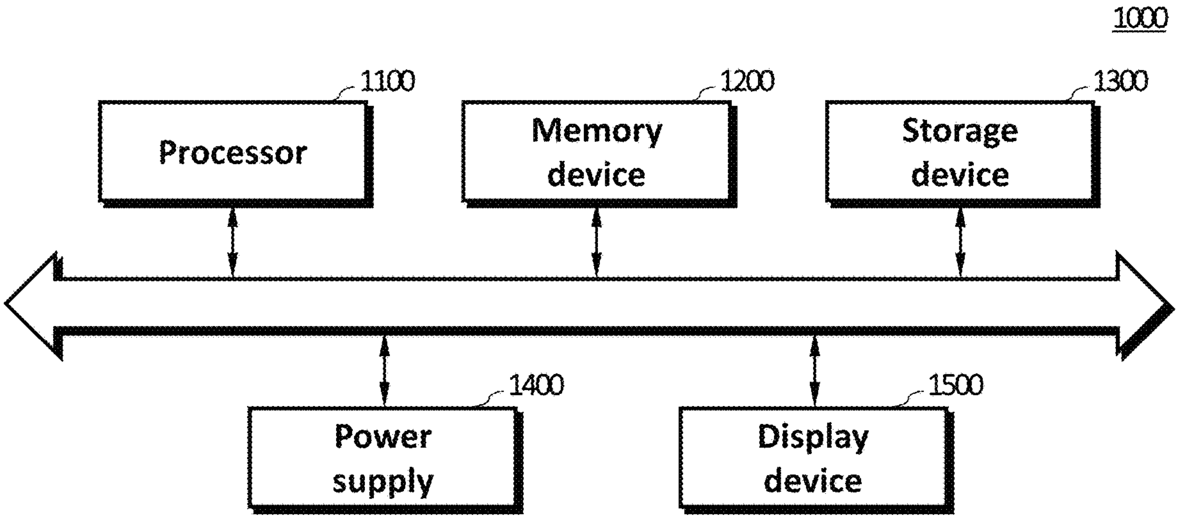
FIG. 9 is a block diagram illustrating a computing system according to an example embodiment.

FIG. 9 is a block diagram of a computing system according to an example embodiment.

Referring to FIG. 9, the computing system 1000 may configure any one of the account manager 100, the trade manager 200, and the plurality of user devices 310 to 330, and may include a processor 1100, a memory device 1200, a storage device 1300, a power supply 1400, and a display device 1500. Although not illustrated in FIG. 9, the computing system 1000 may further include ports that communicate with a video card, a sound card, a memory card, a universal serial bus (USB) device, or other electronic devices.

As described above, the processor 1100, the memory device 1200, the storage device 1300, the power supply 1400, and the display device 1500 included in the computing system 1000 may perform an asset trading method by configuring any one of the account manager 100, the trade manager 200, and the plurality of user devices 310 to 330 according to example embodiments. In detail, the processor 1100 may perform the asset trading method described with reference to FIGS. 1 to 8 by controlling the memory device 1200, the storage device 1300, the power supply 1400, and the display device 1500.

The processor 1100 may perform specific calculations or tasks. According to an embodiment, the processor 1100 may be a micro-processor or a Central Processing Unit (CPU). The processor 1100 may communicate with the memory device 1200, the storage device 1300, and the display device 1500 through a bus such as an address bus, a control bus, and a data bus. In an embodiment, the processor 1100 may be connected to an expansion bus such as a Peripheral Component Interconnect (PCI) bus.

The memory device 1200 may store data necessary for the operation of the computing system 1000. For example, the memory device 1200 may be implemented as a dynamic random access memory (DRAM), a mobile DRAM, a static random access memory (SRAM), a phase-change random access memory (PRAM), a ferroelectric random access memory (FRAM), a resistive random access memory (RRAM), and/or a magnetic random access memory (MRAM). The storage device 1300 may include a solid state drive (SDD), a hard disk drive (HDD), a CD-ROM, etc. The storage device 1300 may store a program associated with the asset trading method described with reference to FIGS. 1 to 8, application program data, system data, operating system data, etc.

The display device 1500 may be an output means for performing a notification with respect to a user, and may display and notify information for the asset trading method to a user or the like. The power supply 1400 may supply an operating voltage necessary for an operation of the computing system 1000.

According to the technical idea of the present disclosure, by generating a transaction for a plurality of asset change values using permutation, even if the asset change value is exposed to the outside, what account or user it is for may not be exposed, and accordingly, the security of the transaction may be increased. In addition, according to the technical idea of the present disclosure, a proof for the plurality of asset change values may be correctly generated even when using permutation.

Exemplary embodiments have been invented in the drawings and the specification as described above. Although the embodiments have been described using specific terms in the present specification, they are used only for the purpose of describing the technical spirit of the present invention, and are not used to limit the meaning or limit the scope of the present invention described in Claims. Therefore, those of ordinary skill in the art will understand that various modifications and other equivalent embodiments are possible therefrom. Therefore, the true technical protection scope of the present invention should be defined by the technical spirit of the appended Claims.

What is claimed is:

1. An asset trading method performed by at least one processor connected to a blockchain network, the method comprising:

obtaining a plurality of asset change values serving as trading targets;

sequentially generating a plurality of commitment values for each of the plurality of asset change values;

permuting the plurality of asset change values;

generating a transaction by sequentially arranging the plurality of commitment values and the plurality of permuted asset change values;

trading assets by verifying the transaction in a smart contract;

proving the plurality of commitment values using zero-knowledge proof;

proving the plurality of asset change values using zero-knowledge proof;

including, in the transaction, a proof value generated as a result of the proof for the plurality of commitment values and the plurality of asset change values; and broadcasting the transaction to a plurality of nodes in the blockchain network, wherein the proving the plurality of commitment values comprises:

obtaining a verification random value;

generating an asset aggregation value based on the verification random value, the plurality of asset change values, and the plurality of permuted asset change values; and proving the asset aggregation value using zero-knowledge proof, wherein when the verification random value is r, a current asset value is $m_i$, the plurality of asset change values is $\Delta m_i$, the plurality of permuted asset change values is $$\Delta m_i',$$

and the number of the plurality of asset change values is N, the asset aggregation value $agg_m$ is generated based on the following equation.

$$agg_m = \sum_{i=1}^{N} r^i \cdot \Delta m_i' + \sum_{i=1}^{N} r^{N+i} \cdot (m_i + \Delta m_i') + \sum_{i=1}^{N} r^{2N+i} \cdot (\Delta m_i).$$

2. The asset trading method of claim 1, wherein the plurality of commitment values has a Pedersen commitment form.

3. The asset trading method of claim 1, wherein the generating the transaction comprises:

obtaining a plurality of addresses respectively corresponding to the plurality of asset change values;

permuting the plurality of addresses to correspond to the plurality of permuted asset change values; and generating the transaction by sequentially arranging the plurality of commitment values, the plurality of permuted asset change values, and the plurality of permuted addresses.

4. The asset trading method of claim 1, wherein the proving the plurality of commitment values comprises:

obtaining a plurality of asset random values respectively corresponding to the asset change values;

generating a random aggregation value based on the verification random value and the plurality of asset random values; and proving the random aggregation value using zero-knowledge proof.

5. The asset trading method of claim 1, wherein the proving the plurality of asset change values comprises:

obtaining a verification random value; and proving whether the plurality of permuted asset change values corresponds to the plurality of asset change values, based on the verification random value, the plurality of asset change values, and the plurality of permuted asset change values, using the zero-knowledge proof.

6. The asset trading method of claim 5, wherein when the verification random value is r, the plurality of asset change values is $\Delta m_i$, the plurality of permuted asset change values is $$\Delta m_i',$$

and the number of the plurality of asset change values is N, whether the plurality of permuted asset change values corresponds to the plurality of asset change values is proved based on the following equation $$\prod_{i=1}^{N} (r + \Delta m_i') = \prod_{i=1}^{N} (r + \Delta m_i).$$

* * * * *